Sept. 30, 1969         C. J. JONES         3,470,048

METHOD OF PATCHING CAR BODIES

Filed Nov. 25, 1964

INVENTOR

CAROL J. JONES

BY

ATTORNEY

United States Patent Office 3,470,048
Patented Sept. 30, 1969

3,470,048
METHOD OF PATCHING CAR BODIES
Carol J. Jones, 9042 12th Ave. S.,
Minneapolis, Minn. 55802
Filed Nov. 25, 1964, Ser. No. 413,789
Int. Cl. B32b 35/00
U.S. Cl. 156—94                                6 Claims

ABSTRACT OF THE DISCLOSURE

The present invention describes a method of patching metal surfaces, such as car bodies, with the use of a patch comprising a backing sheet of sheet metal such as steel having bonded thereto a thin foam plastic sheet having a pressure sensitive surface protected by a covering sheet. After the surface to be mended is cleaned, the covering sheet is removed and the patch is applied over the surface to be mended. The edges of the patch are forced into contact with surface to be patched, connecting the metal backing sheet to the surface to be patched through the foam plastic. The patch is then covered with filler and the exposed surface ground to the proper contour.

---

This invention relates to an improvement in method of repairing holes and rusted areas of automobile bodies, and deals particularly with a means of permanently repairing an area of the body in a small fraction of the time usually required for this purpose.

The method of repairing automobile bodies has changed quite materially over a period of years. Some years ago, it was common practice to repair a dented surface or a hole in the body by flattening out the surface as well as possible by hand, and then applying molten lead to the metal surfaces after the paint had been removed. This molten lead adhered to the metal surface and was built up to a thickness sufficient to produce a smooth outer surface. The repaired area was sanded to provide a smooth continuous surface, and the repaired area was then painted to the color of the original body.

This process of "leading" the injured areas, was not only time consuming, but it also required a relatively high degree of skill to accomplish good results. As a result, as the cost of labor increased, the desirability of employing an alternate method which was less time-consuming and which required less skill, greatly increased. Furthermore, as the thickness of the metal used in making the bodies was decerased, the number of areas which became rusted out increased correspondingly. It is obviously difficult, and often times impossible, to repair the badly rusted out area by the leading technique. Accordingly, it became more and more common to patch the injured areas through the use of sheets of cold rolled steel shaped to fit the injured area and marginally welded to the metal forming the body. After grinding the marginal edges of the patch and welded area, to produce a smooth surface, the area could be repainted. If the work was skillfully done, there would be little evidence of the repair.

Holes in car bodies have also been repaired by riveting or bolting panels of metal over the damaged area, grinding or sanding the patch as smooth as possible, and then leading the adjoining area or applying a suitable filler before repainting. This method is acceptable if the edges of the patch are sealed against the surface repaired, but is costly and time consuming. Repair panels are produced for popular makes of cars which are preformed to certain surfaces and which may be marginally welded in place. Such panels are costly, as most such panels are designed to cover a considerable area, and as only a small area of the total panel is usually used in the repair. The cost also reflects the expense of maintaining, by the supplier, a large inventory of different shaped panels for various body styles.

The welding or riveting method of repairing car bodies practically replaced the repairing of surfaces by the leading process when plastic compositions were developed which could be applied over the patched area to conceal the imperfections. Such plastic filler compositions are applied to the metal surface to be covered, and the plastic is permitted to set. The surface is then sanded down and feathered into the surface of the metal itself, covering the entire patched area. If the sanding operation is done carefully, the repair is almost impossible to see from visual inspection. However, this development also leads to eventual difficulty, particularly where the patch is applied to cover a hole or rusted out area of the body. Due to the fact that the inner surface of the metal used for the repair is exposed to the elements through the hole being covered, there is a tendency for the metal to rust out from the under surface after a period of time. Secondly, due to the fact that the patch is covered after it is applied, there is a tendency for the repair shop to be careless about welding the patch to the body. In some instances, it has been found that used car dealers have even used pieces of cardboard as a base over the hole to be repaired, the plastic being applied over the cardboard and therefore concealing it. Obviously, when the cardboard gets wet and deteriorates, the patch area often breaks away. However, by this time, the used car has been used beyond the guarantee period.

In short cut methods of repair, the backing member is usually merely attached to the fender by the plastic filler. As a result there is a layer of filler between the fender body and the backing sheet which causes considerable difficulty. The plastic filler is not completely moisture proof, and moisture may gradually work its way through the filler. Moisture passing through the hole from the under surface of the fender may wick through the filler and cause the paint to blister. This is a very commòn result where the backing sheet is not waterproof, or where the backing sheet is not secured to the surface being repaired about the edges of the sheet with a waterproof seal. At any time from a couple of days after the hole is repaired to several months later, bubbles or blisters appear in the paint. Merely repainting the area will not correct the situation, as this does not correct the cause.

I have found that most of the difficulties previously experienced may be eliminated, and lasting repairs may be made in a relatively small time, through the use of a thin sheet of polyurethane plastic having both surfaces thereof coated with a pressure sensitive adhesive. Not only is the material resistant to the effects of weather over wide ranges of temperature, but it also is resistent to the effects of vibration or shock which might tend to loosen adhesive which sets firmly.

In carrying out the present method, a repair patch is first produced. This repair patch normally comprises a sheet of metal such as cold rolled sheet steel which is normally at least thirty gauge or more in thickness, or at least 0.012 inch in thickness. To this is adhered a layer of foam plastic which may be, for example, one-thirty second ($\frac{1}{32}$) of an inch in thickness. One side of this double coated tape is adhered to the metal. The opposite surface is covered with a protective layer of paper or the like which is treated so that the covering may be peeled away to expose the adhesive surface.

In making the repair, the protective covering is removed from the foam sheet, and the patch is applied to the surface of the body. The patch is firmly pressed into place either by tapping about the edges of the patch with a hammer or similar tool, or by use of a roller.

The plastic filler is then applied. This plastic filler may be a polyester resin with a filler or an epoxy resin and filler with a suitable activator. After a short period for hardening, the plastic is sanded down to the proper contour, and the surface is ready for priming and painting in the conventional manner.

A further feature of the present invention resides in the fact that where the patch is used to repair a hole in the body of a car, the sheet of foam plastic covers the surface of the patch applied to the car, and which might be exposed to the elements through the aperture being covered. This sheet protects the surface of the patch and prevents it from rusting or corroding.

A further feature of the presen invention resides in the provision of a method for repairing vehicle bodies which may be followed by relatively inexperienced persons. As a result, the body may be adequately repaired by a "Do It Yourself" mechanic through the use of a equipment which is readily available. Through the use of the foam covered sheets of metal, the necessity of welding the sheet to the body, is eliminated.

This not only eliminates the requirement for welding equipment, but also obviates the need for a skilled operator for the welding equipment. As a result, virtually anyone capable of sanding the surface of the resin to a smooth finish, is capable of repairing the hole in the body.

These and other objects and novel features of the present invention will be more clearly and fully set forth in the following specification and claims.

In the drawings forming a part of the specification;

Figure 1:
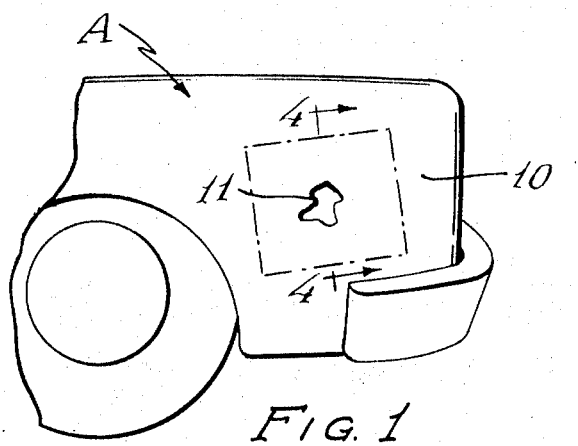
FIGURE 1 is a side elevational view of a portion of an automobile showing a hole in a fender which is to be repaired.
Figure 2:
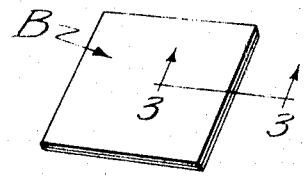
FIGURE 2 is a perspective view of a section of patching material which is used to cover the hole in the fender shown in FIGURE 1.

For the purpose of illustration, the vehicle A is shown as including a fender 10 having an aperture 11 therethrough. The aperture 11 may be the result of an accident, or may be a rusted area. The purpose of the present method is to cover the aperture 11 and to finish the fender 10, in such a manner that the aperture will no longer be visible.

The method is carried on through the use of a patch B. The patch B comprises a sheet of metal such as cold rolled steel of proper thickness to serve as a support for the covering material. This steel may be as thin as 30 gauge sheet metal, which is 0.012 inch in thickness or may be as thick as 24 gauge steel. The use of thinner sheet steel is somewhat preferred where the metal must be shaped to fit a curved surface due to its greater resilience and flexibility. On the other hand, the use of thicker sheet metal obviously provides a stronger patch and is desirable for that reason.

Adhered to a surface of the sheet metal is a thin film of material which may comprise a product sold by Minnesota Mining & Manufacturing Company in St. Paul, Minn., under the trademark "Scotch-Mount" Pressure Sensitive Tape No. 4032, double coated foam. The film preferred is one thirty-second of an inch in thickness, this thickness being capable of providing lasting protection for the metal surface and also providing an effective means of securing the sheet metal to the body of the vehicle. Tape of the type in question has been commercially sold and used for such purposes as supporting pay telephones on vertical wall surfaces, attaching kitchen cabinets to vertical wall surfaces, and for many other such uses. Tests have indicated that this film will withstand the effects of the elements over long periods of time, and is capable of remaining in place throughout the usual life of vehicles.

The pressure sensitive tape film is supplied in rolls with at least one of the adhesive coated surfaces covered by a protective sheet of paper or fabric, which is treated so that it may be readily peeled from the adhesive.

The sheet metal is also preferably supplied in rolls, and one adhesive coated surface of the tape is attached to the surface of the metal common normally in a continuous operation. Before the tape is applied to the metal, the metal surface is thoroughly cleaned to remove all oil and dust. In this operation, a solvent such as commercial solvents known to the trade, may be employed. The surface of the tape, which is opposite that adhered to the metal, remains covered with the removable paper covering sheet.

The laminated material is cut into convenient length for storage and shipment. For example, the patch material may be cut into sheets one foot by three feet in size, or may be sold in sheets one foot square. Obviously, the sheets may be of any convenient size desired.

In repairing the hole 11 in the fender 10, for example, the area of the fender surrounding the aperture 11, is straightened out or bent to the proper contour as nearly as is practical, and an area of the fender is prepared by grinding the paint from the surface of the metal until an area is exposed, which is substantially larger than the area of the patch to be used. The patch, itself, should be of proper size to overlap the metal encircling the aperture by at least two and one-half to three inches on all sides of the aperture. The bared surface is considerably larger than the area of the patch for purposes which will be later obvious.

After the metal of the fender is exposed, the surface is thoroughly cleaned to remove all traces of oil and dust. For this purpose, an oil solvent may be employed. The exposed metal is wiped off thoroughly with a clean cloth to insure a proper base for the patch.

Figure 3:
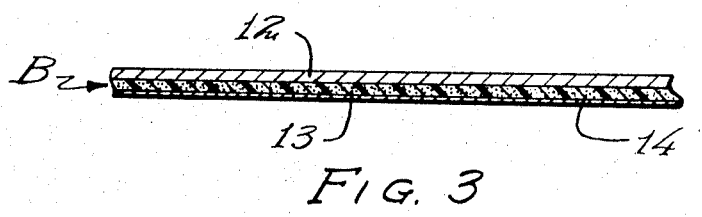
FIGURE 3 is an enlarged sectional view through a portion of the patch, the position of the section being indicated by the line 3—3 of FIGURE 2.

If desired at this point, or even prior to the cleaning operation, the patch B may be bent to conform generally to the contour of the surface of the fender to which it is applied. FIGURE 3 of the drawings, shows the metal backing sheet at 12, the foam plastic film at 13, and the protective covering sheet at 14. When the patch is to be applied, the protective covering sheet 14 is removed from the adhesive coated surface of the foam 13, and the patch is urged into engagement with the surface of the fender 10. Usually, the patch is forced firmly against the surface of the fender, by tapping or hammering the marginal edge portion of the patch against the fender, this causing the adhesive to be firmly bonded to the metal of the fender encircling the aperture 11. In some instances, the sealing pressure may be applied through the use of a roller of the type commonly used to adhere wallpaper to the surface of a wall.

Figure 4:
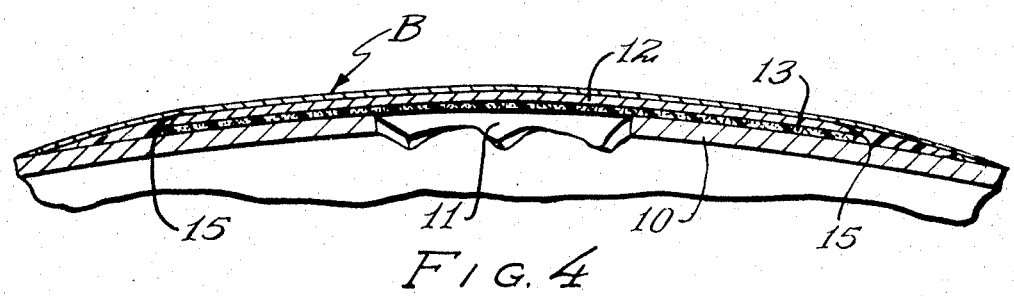
FIGURE 4 is an enlarged sectional view through the fender after the repair is complete, the position of the section being indicated by the line 4—4 of Figure 1.

After the patch B has been applied, the outer exposed surface of the metal backing 12, is usually sanded to roughen the surface and to make the surface more firmly engageable with the plastic resin coating, which will overlay the patch. The edges of the patch are usually feathered as indicated at 15 in FIGURE 4 of the drawings, so as to render the patch as inconspicuous as possible, and to eliminate the shoulder formed by the edge of the metal. The actual patching operation is now complete. The remainder of the process is followed to cover the patch and to eliminate all indications that the fender has been patched.

The patch in the surrounding area of the fender 10, is extra covered with a plastic coating. This coating is of a type which is available for covering welded patches and the like, and may comprise polyester resin containing approximately 50% by weight of talc or other filler. Cobalt may be used as a hardener. This resin may be reacted with a material such as methyl ethyl ketone peroxide, benzyl peroxide or the like. This product dries to provide a very hard surface in a relatively short period of time.

After the plastic coating has hardened, the surface is carefully sanded so as to blend the surface with the surface of the fender. If the grinding is carefully done, the patch is completely concealed and it is virtually impossible to detect the patched area when the method is complete. After grinding, the surface is painted in the usual manner, usually first with the application of an undercoat or primary coat, followed by an outer covering to match the finish of the vehicle.

Figure 5:
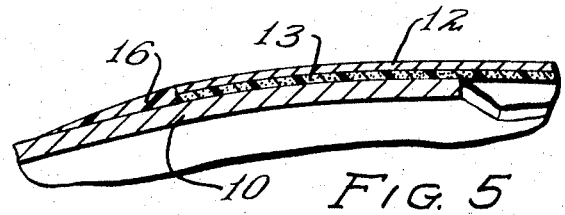
FIGURE 5 is a view similar to FIGURE 4 showing a modified form of construction.

While the method described is the preferred method of repairing the vehicle body, certain of the steps may be changed or modified if desired. For example, the fact that no welding is involved makes it possible to substitute a non-metallic backing sheet, such as fiberglass, in place of the cold rolled steel. Furthermore, as shown in FIGURE 5, where the outer surface of the backing sheet is smooth, it is possible to use the plastic filler 16 only surrounding the patch rather than covering the same. The plastic filler is then employed for feathering the edges of the patch to the surface of the fender 10.

The patch and plastic filler can often be successfully applied over the painted surface of the body. However, grinding or sanding the surface to expose the metal of the body usually provides a better bond with the material applied, and insures the surface to be free of any oily film. Lead may be used instead of the plastic filler, if preferred; but as previously indicated, leading is more expensive and more difficult to do.

The patch may also be factory preformed to fit predetermined areas of cars, similarly to the preformed panels now produced. However, such preformed panels are subject to the objections previously described. In production the panels are formed to shape after the adhesive coated film is in place.

A second polyurethane tape could be used in place of the one mentioned. Scotch-Mount Pressure Sensitive Tape No. Y-9122 is also a double adhesive coated foam tape, but is much denser. This latter tape is more resistant to splitting between the surfaces than the previously described tape No. 4032. However, the tape No. 4032 possesses adequate resistance to splitting, and provides greater cushioning. The use of the relatively thick foam tape is of importance, as a secure bond is provided over a somewhat uneven surface.

I claim:
1. The method of repairing a hole in a metal surface of a vehicle body, the method consisting in the steps of:
   attaching to a formable backing sheet a thin layer of foam plastic having opposite surfaces coated with a pressure sensitive adhesive by pressing one surface of said foam plastic against the backing sheet while the other surface thereof is covered by a protective covering sheet,
   cleaning the metal surface to remove dust and oil therefrom,
   removing the protective covering sheet from the other surface of said foam plastic and positioning the backing sheet to overlie the hole with the foam plastic against the metal surface,
   pressing the edges of the backing sheet firmly against the metal surface in the area around the hole,
   applying spreadable patching filler material to the area of the metal surface encircling said backing sheet and while said patching material is in a plastic state and then allowing said patching material to set, and
   grinding said patching material to a feathered edge at the surface of the metal surface in order to conceal the marginal edges of the backing sheet and foam plastic.

2. The method of claim 1 and including the further step of painting over the backing sheet and patching material.

3. The method of claim 1 and including the step of covering the surface of the backing sheet opposite that to which the patching material is adhered with patching material.

4. The method of repairing a hole in a metal surface of a vehicle body, the method consisting in the steps of:
   attaching to a formable backing sheet of steel a thin layer of foam plastic, the foam plastic having its opposite surfaces coated with a pressure sensitive adhesive, by pressing an adhesive coated surface to a surface of the formable backing sheet while the opposite surface of the foam plastic is covered by a protective covering sheet,
   cleaning the metal surface in the area encircling the hole to remove dust and oil,
   cutting the backing sheet to a size to cover the hole and to overlap an area of the metal surface encircling the hole,
   removing the protective covering sheet from the backing sheet and applying the adhesive coated surface of the foam plastic to overlie the hole,
   pressing the marginal edges of the backing sheet firmly against the area of the metal surface encircling the hole,
   grinding the marginal edges of the backing sheet to reduce the thickness thereof,
   applying a plastic filler to the area of the metal surface encircling the backing sheet, the plastic filler being selected from the class consisting of a polyester resin and filler mixed with a catalyst and an epoxy resin and filler mixed with a catalyst, and
   grinding the surface of the plastic filler to a feathered edge at the surface of the metal surface.

5. The method of claim 4 and including the further step of painting the patched area.

6. The method of claim 4 and in which the plastic filler at least partially overlies the backing sheet.

References Cited
UNITED STATES PATENTS
3,242,239    3/1966    Schafer _____ 264—36

EARL M. BERGERT, Primary Examiner

H. F. EPSTEIN, Assistant Examiner